United States Patent [19]
Koizumi et al.

[11] Patent Number: 5,826,327
[45] Date of Patent: Oct. 27, 1998

[54] TEMPORARY ASSEMBLING UNIT FOR HEAT EXCHANGER CORE

[75] Inventors: Hiroyasu Koizumi; Hisashi Onuki, both of Tokyo, Japan

[73] Assignee: Calsonic Corporation, Tokyo, Japan

[21] Appl. No.: 824,464

[22] Filed: Mar. 26, 1997

[51] Int. Cl.$^6$ ..................................................... B23P 15/26
[52] U.S. Cl. ........................................ 29/726; 29/890.039
[58] Field of Search ...................... 29/726, 727, 890.03, 29/890.039; 414/799

[56] References Cited

U.S. PATENT DOCUMENTS

| | | | |
|---|---|---|---|
| 2,410,140 | 10/1946 | Young | 414/799 |
| 2,517,370 | 8/1950 | Young | 414/799 |
| 4,321,739 | 3/1982 | Martin et al. | 29/726 |
| 4,611,375 | 9/1986 | Zapawa | 29/726 |
| 4,637,132 | 1/1987 | Iwase et al. | 29/726 |
| 4,901,414 | 2/1990 | Breda et al. | 29/726 |
| 4,929,144 | 5/1990 | Fraser | 414/799 |
| 5,022,814 | 6/1991 | Breda et al. | 414/799 |
| 5,029,382 | 7/1991 | Breda et al. | 29/726 |
| 5,226,234 | 7/1993 | Beddome et al. | 29/890.039 |

FOREIGN PATENT DOCUMENTS

| | | |
|---|---|---|
| 0 342 975 | 11/1989 | European Pat. Off. . |
| 03-166023 | 7/1991 | Japan . |
| 03-199896 | 8/1991 | Japan . |
| 821 976 | 10/1959 | United Kingdom . |

OTHER PUBLICATIONS

International Search Report.

*Primary Examiner*—Irene Cuda
*Attorney, Agent, or Firm*—Sughrue, Mion, Zinn, Macpeak & Seas, PLLC

[57] ABSTRACT

A temporary assembling unit for a heat exchanger core including a pair of parallel feed shafts placed facing each other in a predetermined spacing, includes spiral tube guide grooves for guiding ends of a tube of the heat exchanger; and spiral fin guide parts for guiding ends of a corrugated fin of the heat exchanger, the spiral fin guide parts being disposed between the tube guide grooves; wherein an outer diameter of the fin guide part positioned in a supply section of the corrugated fin is smaller than an outer diameter of the tube guide groove.

2 Claims, 4 Drawing Sheets

TEMPORARY ASSEMBLING UNIT FOR HEAT EXCHANGER CORE

BACKGROUND OF THE INVENTION

1. Field of the Invention

This invention relates to a temporary assembling unit for a heat exchanger core for temporarily assembling a heat exchanger core by placing tubes and corrugated fins alternately.

2. Description of the Prior Art

For example, a temporary assembling unit for a heat exchanger core as disclosed in Japanese Patent Publication No. Hei. 3-166023 is known as a conventional temporary assembling unit for a heat exchanger core for temporarily assembling a heat exchanger core by placing tubes and corrugated fins alternately.

FIG. 3 shows the temporary assembling unit for a heat exchanger core disclosed in Japanese Patent Publication No. Hei. 3-166023. The assembling unit of a heat exchanger core comprises a pair of parallel feed shafts 11 and 13 placed facing each other in a predetermined spacing.

The pair of the feed shafts 11 and 13 is formed with spiral tube guide grooves 11a and 13a for guiding ends of a tube 15 and spiral fin guide parts 11b and 13b for guiding ends of a corrugated fin 17 between the tube guide grooves 11a and 11a and between 13a and 13a.

The fin guide part 11b, 13b has a larger outer diameter than that of the tube guide groove 11a, 13a.

The spiral directions of the tube guide grooves 11a, 13a and the fin guide parts 11b, 13b are made opposite and the feed shafts 11 and 13 are rotated in the opposite directions.

The spiral pitches are lessened from a material supply section 19 to a temporary assembling section 21.

In the temporary assembling unit for a heat exchanger core, a tube 15 is supplied between the tube guide grooves 11a and 13a in a rod member supply section 19A of the material supply section 19 and a corrugated fin 17 is supplied between the fin guide parts 11b and 13b in a fin supply section 19B of the material supply section 19.

The tube 15 and the corrugated fin 17 are moved on the tube guide grooves 11a and 13a and the fin guide parts 11b and 13b as the feed shafts 11 and 13 rotate, and with the spacing between the tube 15 and the corrugated fin 17 narrowed, the tube 15 and the corrugated fin 17 are abutted against each other in the temporary assembling section 21 for temporarily assembling a heat exchanger core 23.

Normally, after a predetermined number of tubes 15 are supplied, a reinforcement 25 is supplied in place of the tube 15 in the rod member supply section 19A for temporarily assembling the heat exchanger core 23 having the reinforcement 25 placed on each end.

However, in the conventional temporary assembling unit for a heat exchanger core, when the corrugated fin 17 is supplied from the fin supply section 19B to the space between the fin guide parts 11b and 13b of the pair of the feed shafts 11 and 13, a phenomenon in which both ends of the corrugated fin 17 run on to the fin guide parts 11b and 13b occurs, as shown in FIG. 4. In such a case, it becomes difficult to reliably place the corrugated fin 17 between the tubes 15, thus the temporary assembling unit is stopped and the corrugated fin 17 needs to be placed in a predetermined position.

That is, generally the corrugated fin 17, which is shaped like waves, is easily deformed elastically and is hard in length dimension management; for example, length variations of about 20 mm are allowed. The corrugated fin 17 may lengthen exceeding the allowed variation range. In such a case, when the corrugated fin 17 is supplied, a phenomenon in which both ends of the corrugated fin 17 run on to the fin guide parts 11b and 13b occurs.

SUMMARY OF THE INVENTION

It is therefore an object of the invention to provide a temporary assembling unit for a heat exchanger core that can easily and reliably prevent both ends of a corrugated fin from running on to fin guide parts when the corrugated fin is supplied.

According to the present invention, there is provided a temporary assembling unit for a heat exchanger core including a pair of parallel feed shafts placed facing each other in a predetermined spacing, comprising: spiral tube guide grooves for guiding ends of a tube of the heat exchanger; and spiral fin guide parts for guiding ends of a corrugated fin of the heat exchanger, the spiral fin guide parts being disposed between the tube guide grooves; wherein an outer diameter of the fin guide part positioned in a supply section of the corrugated fin is smaller than an outer diameter of the tube guide groove.

In the above temporary assembling unit for a heat exchanger core, outer diameters of the fin guide parts may be made larger gradually in a feed direction from the supply section of the corrugated fin.

In the temporary assembling unit for a heat exchanger core according to the present invention, the outer diameter of the fin guide part positioned in the supply section of the corrugated fin formed on the pair of feed shafts is made smaller than the outer diameter of the tube guide groove. Thus, when the feed shafts are placed facing each other in parallel in a predetermined spacing, the spacing between the fin guide parts of the pair of feed shafts becomes larger than the spacing between the tube guide grooves and becomes a sufficiently longer spacing than the length of the tube.

Further, if the outer diameters of the fin guide parts are made larger gradually in the feed direction from the supply section of the corrugated fin, as the corrugated fin moves, it is shrunk gradually.

DETAILED DESCRIPTION OF THE PREFERRED EMBODIMENTS

Referring now to the accompanying drawings, there are shown preferred embodiments of the invention.

Figure 1:
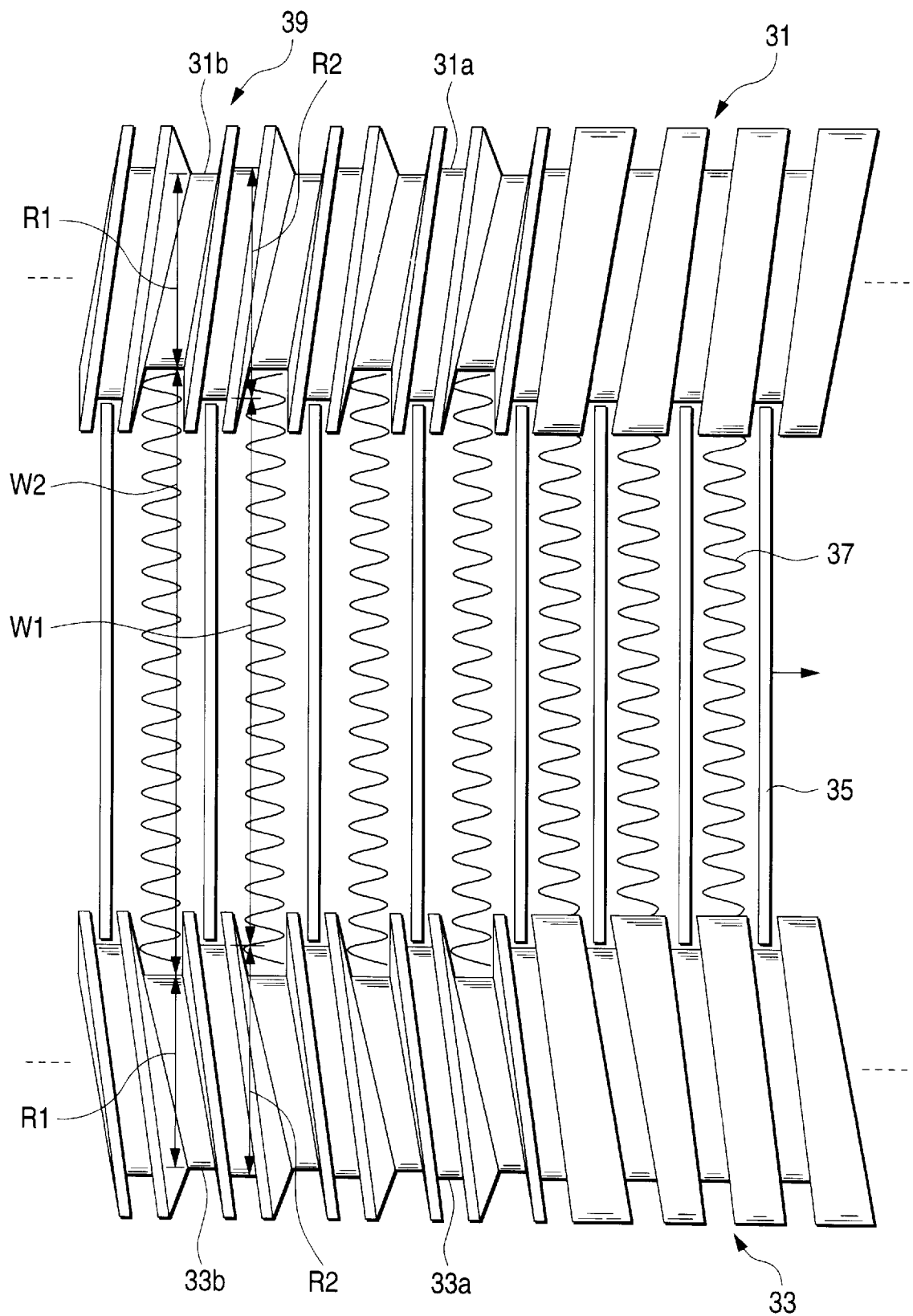
FIG. 1 is a top view showing the main part of a first embodiment of a temporary assembling unit for a heat exchanger core of the invention.

FIG. 1 shows the main part of a first embodiment of a temporary assembling unit for a heat exchanger core of the invention, wherein numerals 31 and 33 denote a pair of feed shafts.

The feed shafts 31 and 33 are placed facing each other in parallel in a predetermined spacing.

The pair of the feed shafts 31 and 33 is formed with spiral tube guide grooves 31a and 33a for guiding ends of a tube 35.

The pair of the feed shafts 31 and 33 is formed with spiral fin guide parts 31b and 33b for guiding ends of a corrugated fin 37 between the tube guide grooves 31a and 31a and between 33a and 33a.

The spiral directions of the tube guide grooves 31a, 33a and the fin guide parts 31b, 33b are made opposite, providing the relationship between right and left screws and the feed shafts 31 and 33 are rotated in the opposite directions.

In the embodiment, outer diameter R1 of a fin supply section 39 of the corrugated fin 37 and the fin guide part 31b, 33b positioned at three continuous pitches on the transport side of the fin supply section 39 is made smaller than outer diameter R2 of the tube guide groove 31a, 33a.

In the embodiment, the outer diameter R1 of the fin guide part 31b, 33b is set to 45 mm, for example, and the outer diameter R2 of the tube guide groove 31a, 33a is set to 75 mm, for example.

Spacing W1 between the tube guide grooves 31a and 33a of the pair of feed shafts 31 and 33 is set to 300 mm, for example.

Therefore, spacing W2 between the fin guide parts 31b and 33b of the pair of feed shafts 31 and 33 becomes 330 mm.

Figure 3:
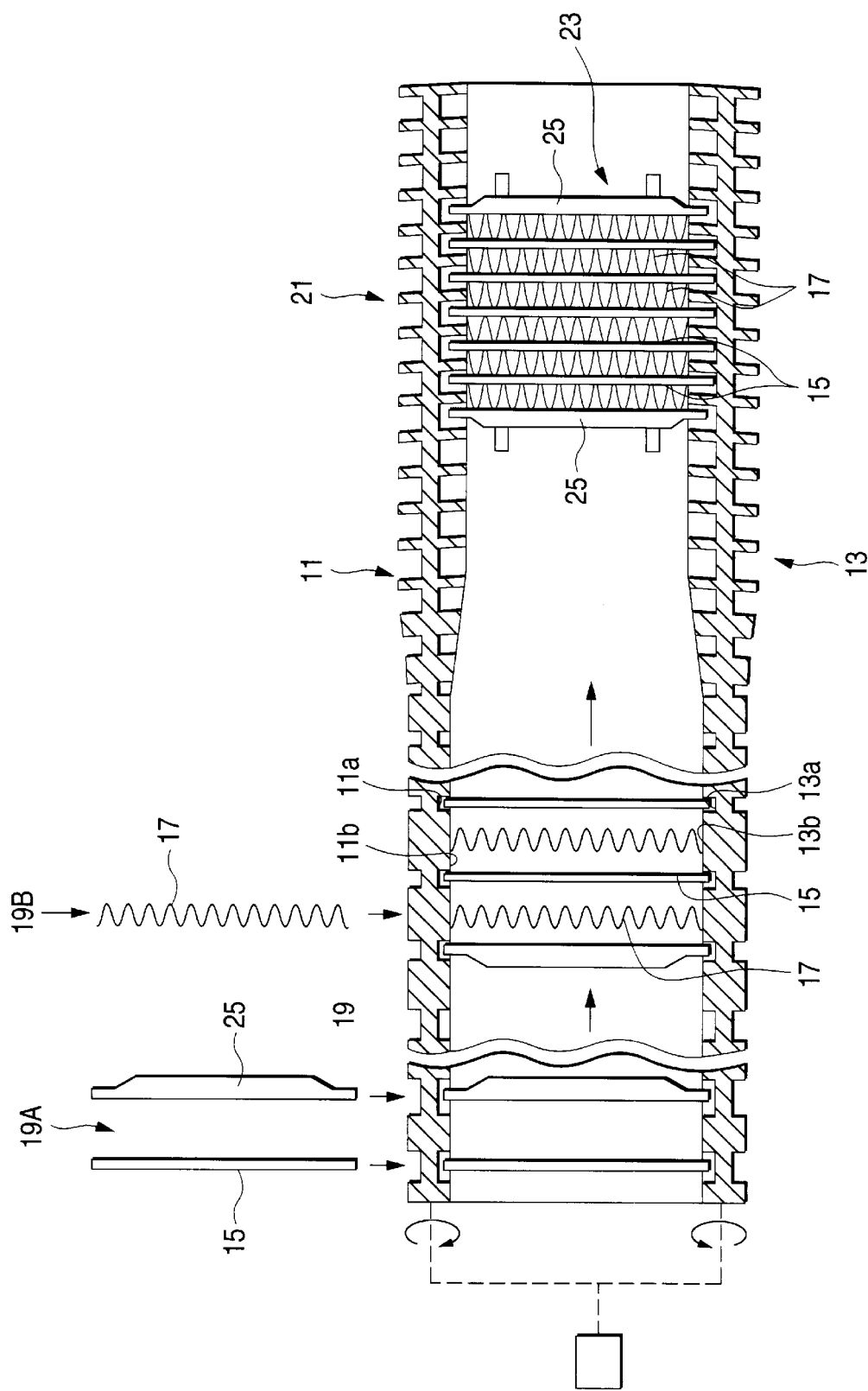
FIG. 3 is a sectional view showing a conventional temporary assembling unit for a heat exchanger core.
Figure 4:
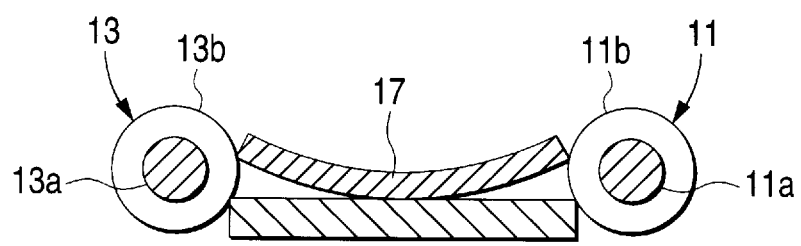
FIG. 4 is an illustration to show a state in which a corrugated fin runs on to fin guide parts in the temporary assembling unit for a heat exchanger core in FIG. 3.

In the temporary assembling unit for a heat exchanger core like the conventional unit shown in FIG. 3, a tube 35 is supplied between the tube guide grooves 31a and 33a in a tube supply section placed upstream from the fin supply section 39 and a corrugated fin 37 is supplied between the fin guide parts 31b and 33b in the fin supply section 39, The tube 35 and the corrugated fin 37 are moved on the tube guide grooves 31a and 33a and the fin guide parts 31b and 33b as the feed shafts 31 and 33 rotate, and as in the conventional temporary assembling unit for a heat exchanger core shown in FIG. 3, with the spacing between the tube 35 and the corrugated fin 37 narrowed, the tube 35 and the corrugated fin 37 are abutted against each other for temporarily assembling a heat exchanger core.

Also in the embodiment like the conventional unit shown in FIG. 3, normally, after a predetermined number of tubes 35 are supplied, a reinforcement is supplied in place of the tube 35 in the tube supply section 39 for temporarily assembling the heat exchanger core having the reinforcement placed on each end.

In the temporary assembling unit for a heat exchanger core thus configured, the outer diameter R1 of the fin guide part 31b, 33b positioned in the fin supply section 39 of the corrugated fin 37 formed on the pair of feed shafts 31 and 33 is made smaller than the outer diameter R2 of the tube guide groove 31a, 33a. Thus, when the feed shafts 31 and 33 are placed facing each other in parallel in a predetermined spacing, the spacing W2 between the fin guide parts 31b and 33b of the pair of feed shafts 31 and 33 becomes larger than the spacing W1 between the tube guide grooves 31a and 33a and becomes a sufficiently longer spacing than the length of the tube 35.

Therefore, if the corrugated fin 37 becomes longer than the allowable dimension, a phenomenon in which when the corrugated fin 37 is supplied, both ends thereof run on to the fin guide parts 31b and 33b can be prevented easily and reliably.

Figure 2:
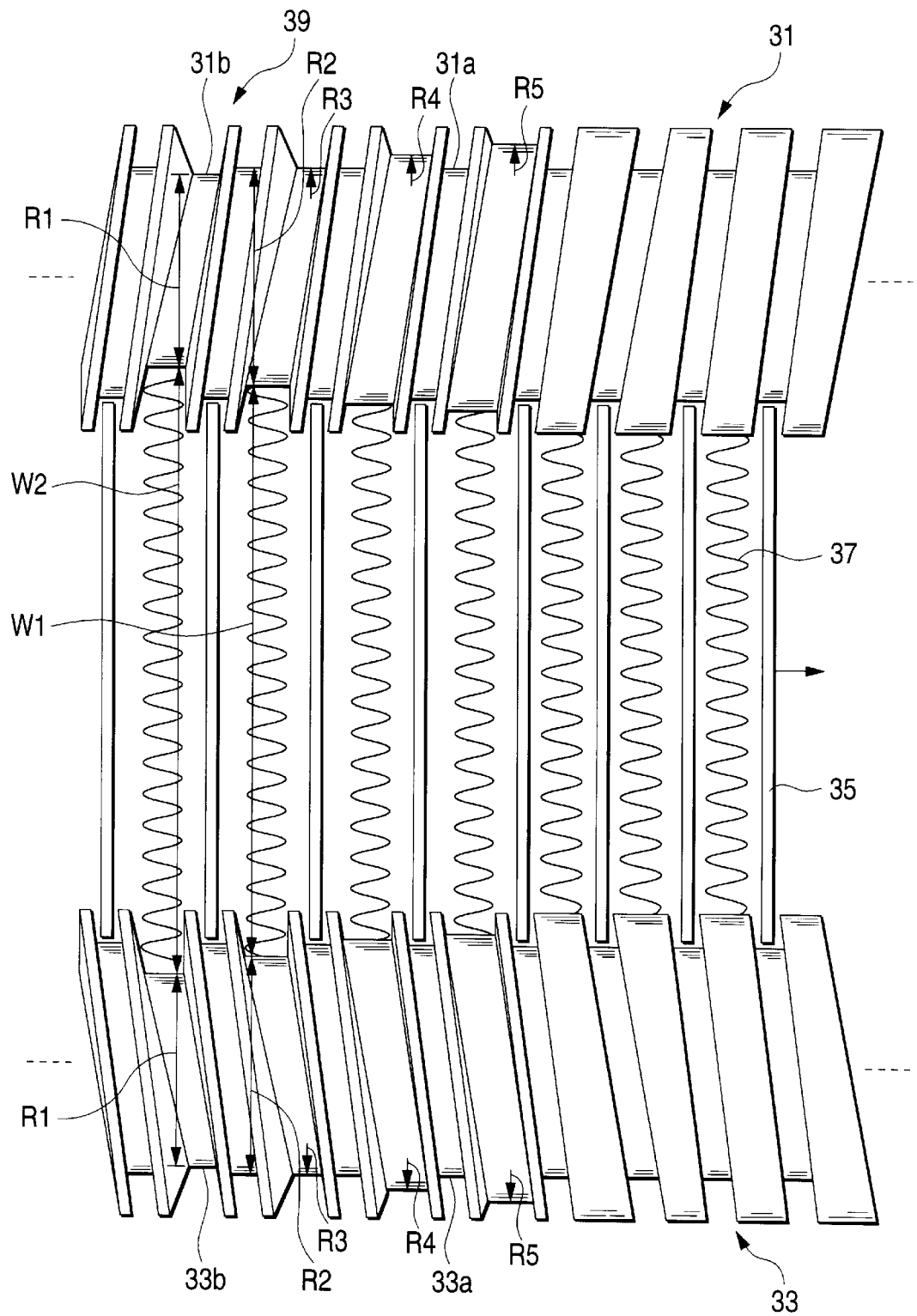
FIG. 2 is a top view showing the main part of a second embodiment of a temporary assembling unit for a heat exchanger core of the invention.

FIG. 2 shows a second embodiment of a temporary assembling unit for a heat exchanger core of the invention. In the second embodiment, the outer diameters of the fin guide parts 31b, 33b positioned at three continuous pitches on the transport side of the fin supply section 39 in the first embodiment are made larger gradually as R3, R4, and R5 in the feed direction from the fin supply section 39 of the corrugated fin 37.

In the second embodiment, as the corrugated fin 37 moves, it is shrunk gradually, thus can be reliably shrunk to a predetermined length.

As we have discussed, in the temporary assembling unit for a heat exchanger core in the present invention, the outer diameter of the fin guide part positioned in the supply section of the corrugated fin formed on the pair of feed shafts is made smaller than the outer diameter of the tube guide groove. Thus, when the feed shafts are placed facing each other in parallel in a predetermined spacing, the spacing between the fin guide parts of the pair of feed shafts becomes larger than the spacing between the tube guide grooves and becomes a sufficiently longer spacing than the length of the tube.

Therefore, if the corrugated fin becomes longer than the allowable dimension, a phenomenon in which when the corrugated fin is supplied, both ends thereof run on to the fin guide parts 31band 33bcan be prevented easily and reliably.

Further, if the outer diameters of the fin guide parts are made larger gradually in the feed direction from the supply section of the corrugated fin, as the corrugated fin moves, it is shrunk gradually and can be reliably shrunk to a predetermined length.

What is claimed is:

1. A temporary assembling unit for a heat exchanger core including a pair of parallel feed shafts placed facing each other in a predetermined spacing, comprising:

spiral tube guide grooves for guiding ends of a tube of the heat exchanger, and spiral fin guide parts for guiding ends of a corrugated fin of the heat exchanger, the spiral fin guide parts being disposed between said tube guide grooves;

wherein an outer diameter of said fin guide part positioned in a supply section of the corrugated fin is smaller than an outer diameter of said tube guide groove.

2. The temporary assembling unit for a heat exchanger core according to claim 1, wherein outer diameters of said fin guide parts are made larger gradually in a feed direction from the supply section of the corrugated fin.

* * * * *